(12) United States Patent
Leem

(10) Patent No.: US 11,217,382 B2
(45) Date of Patent: Jan. 4, 2022

(54) COIL DEVICE AND WIRELESS CHARGING DEVICE INCLUDING SAME

(71) Applicant: LG INNOTEK CO., LTD., Seoul (KR)

(72) Inventor: Sung Hyun Leem, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 195 days.

(21) Appl. No.: 16/633,682

(22) PCT Filed: Jul. 19, 2018

(86) PCT No.: PCT/KR2018/008182
§ 371 (c)(1),
(2) Date: Jan. 24, 2020

(87) PCT Pub. No.: WO2019/022438
PCT Pub. Date: Jan. 31, 2019

(65) Prior Publication Data
US 2020/0373072 A1    Nov. 26, 2020

(30) Foreign Application Priority Data
Jul. 25, 2017    (KR) .......................... 10-2017-0093955

(51) Int. Cl.
*H01F 27/28*    (2006.01)
*H02J 50/12*    (2016.01)
(Continued)

(52) U.S. Cl.
CPC ......... *H01F 27/288* (2013.01); *H01F 1/0315* (2013.01); *H01F 27/306* (2013.01); *H02J 50/12* (2016.02)

(58) Field of Classification Search
CPC ...... H01F 27/288; H01F 27/36; H01F 1/0315; H01F 27/306; H01F 38/14; H02J 50/12; H02J 7/025; H04B 5/0031
(Continued)

(56) References Cited

U.S. PATENT DOCUMENTS 9,647,483 B1   5/2017   Bana et al.
10,164,471 B2   12/2018   Jang et al.
(Continued)

FOREIGN PATENT DOCUMENTS

JP    2014-027880    2/2014
KR    10-0949327    3/2010
(Continued)

OTHER PUBLICATIONS

International Search Report dated Nov. 6, 2018 issued in Application No. PCT/KR2018/008182.

*Primary Examiner* — Alfonso Perez Borroto
(74) *Attorney, Agent, or Firm* — KED & Associates, LLP

(57) ABSTRACT

The present embodiment relates to a coil device and a wireless charging device including the same. The coil device according to the present embodiment includes: a coil wound to form a hollow portion; and a shielding housing including a flat part on which the coil is disposed, an inner wall corresponding to a shape of the hollow portion, and an outer wall corresponding to an outer circumferential shape of the coil. The inner wall protruding from the flat part on which the coil is disposed may have a height of 0 to 1.5 times a height of the coil. An inductance of the coil may have a range of 9.2 µH to 12.26 µH.

15 Claims, 12 Drawing Sheets

(51) Int. Cl.
*H01F 1/03* (2006.01)
*H01F 27/30* (2006.01)

(58) Field of Classification Search
USPC .......................................................... 307/104
See application file for complete search history.

(56) References Cited

U.S. PATENT DOCUMENTS

| | | | |
|---|---|---|---|
| 10,243,402 B2 | 3/2019 | Park et al. | |
| 2004/0090298 A1 | 5/2004 | Masu et al. | |
| 2009/0096413 A1* | 4/2009 | Partovi | H01F 27/36 |
| | | | 320/108 |
| 2013/0249307 A1* | 9/2013 | Kusaka | H04B 5/0031 |
| | | | 307/104 |
| 2015/0288196 A1 | 10/2015 | Park et al. | |
| 2017/0126059 A1* | 5/2017 | Takahashi | H02J 7/025 |
| 2018/0108471 A1* | 4/2018 | Park | H01F 38/14 |

FOREIGN PATENT DOCUMENTS

| | | |
|---|---|---|
| KR | 10-2012-0135737 | 12/2012 |
| KR | 10-2013-0016588 | 2/2013 |
| KR | 10-2015-0115271 | 10/2015 |
| KR | 10-2016-0055004 | 5/2016 |
| KR | 10-2017-0075608 | 7/2017 |

\* cited by examiner (b)

(b)

(a)

(b)

(a)

(b)

(a)

(b)

(a)

(b)

(c)

(a)

(b)

(c)

(a)

(b)

(c)

(a)

(b)

(c)

COIL DEVICE AND WIRELESS CHARGING DEVICE INCLUDING SAME

CROSS-REFERENCE TO RELATED PATENT APPLICATIONS

This application is a U.S. National Stage Application under 35 U.S.C. § 371 of PCT Application No. PCT/KR2018/008182, filed Jul. 19, 2018, which claims priority to Korean Patent Application No. 10-2017-0093955, filed Jul. 25, 2017, whose entire disclosures are hereby incorporated by reference.

TECHNICAL FIELD

The present embodiment relates to wireless charging, and more particularly, to a coil device for wireless charging and a wireless charging device including the same.

BACKGROUND ART

A portable terminal such as a mobile phone or a notebook computer includes a battery for storing electric power and a circuit for charging and discharging the battery. In order to charge the battery of such a terminal, electric power should be supplied from an external charger.

Generally, as an example of an electrical connection method between a battery and a charging device for charging electric power to the battery, there is a terminal supply method in which commercial power is supplied and converted into voltage and current corresponding to the battery to supply electric energy to the battery through a terminal of the battery. Such a terminal supply method requires use of a physical cable or an electric wire. Therefore, when a lot of devices of the terminal supply method are used, a lot of cables occupy a considerable work space and are difficult to organize, and are not good in appearance. Further, the terminal supply method may cause problems such as instantaneous discharge due to different electric potential differences between terminals, occurrence of burnout or fire due to foreign matters, spontaneous discharge, and deterioration in lifespan and performance of the battery, etc.

Recently, in order to solve such problems, a charging system (hereinafter referred to as "wireless charging system") using a method of transmitting power wirelessly and control methods have been proposed. In addition, in the past, wireless charging systems were not standard on some portable devices, and consumers had to purchase separate wireless charging receiver accessories, so that the demand for wireless charging systems was low. In the future, it is expected that the number of users using wireless charging will increase rapidly and terminal manufacturers will basically be equipped with a wireless charging function.

In general, a wireless charging system includes a wireless power transmitter that supplies electric energy by a wireless power transmission method, and a wireless power receiver that receives electric energy supplied from the wireless power transmitter and charges a battery.

Meanwhile, in order to transmit wireless power, the wireless power transmitter includes a transmission coil, and in order to receive wireless power, the wireless power receiver includes a reception coil. Such a transmission coil and a reception coil have high efficiency of wireless power transmission/reception limited to a specific region in which the coil is wound with a critical number of turns at a predetermined length.

In general, efficiency of power transmission and reception may be controlled by adjusting a frequency of a coil and fixing inductance in an impedance matching circuit according to a transmitter or a receiver. In such a case, a control configuration using another impedance matching circuit is required, and a heat generation problem due to inductance matching may occur.

Technical Problem

The present embodiment has been devised to solve the above-described problems of the related art, and the present embodiment is directed to providing a coil device and a wireless charging device including the same.

In addition, the present embodiment is directed to providing a coil device capable of controlling an inductance value that meets a standard for each coil type, and a wireless charging device including the same.

Further, the present embodiment provides a coil device for reducing heat generation due to inductance matching of a coil, and a wireless charging device including the same.

In addition, the present embodiment provides a coil device capable of improving wireless charging efficiency and easily varying a performance standard of a coil in a device, and a wireless charging device including the same.

Technical problems to be solved in the present embodiment are not limited to the above-mentioned technical problems, and other technical problems not mentioned will be clearly understood by a person having ordinary skill in the art to which the present embodiment pertains, from the following descriptions.

Technical Solution

In order to solve the above-described problems, a coil device according to the present embodiment includes: a coil wound to form a hollow portion; and a shielding housing including a flat part on which the coil is disposed, an inner wall corresponding to a shape of the hollow portion, and an outer wall corresponding to an outer circumferential shape of the coil. The inner wall protruding from the flat part on which the coil is disposed may have a height of 0 to 1.5 times a height of the coil. An inductance of the coil may have a range of 9.2 µH to 12.26 µH.

The height of the inner wall may vary to correspond to the inductance of the coil.

When the height of the inner wall is 0, the inner wall is formed to be the same height as an upper surface of the flat part.

The height of the inner wall has a range of 0 to 3.3 mm.

A width of the inner wall corresponds to a width of the hollow portion.

The width of the inner wall decreases as the height of the inner wall increases.

The coil is formed of two layers.

The outer wall has a height corresponding to the height of the coil.

The outer wall may include a leading groove such that the coil is drawn out.

The shielding housing may include ferrite.

A wireless charging device according to the present embodiment includes: a coil device including a coil wound to form a hollow portion and a shielding housing including a flat part on which the coil is disposed, an inner wall corresponding to a shape of the hollow portion, and an outer wall corresponding to an outer circumferential shape of the coil; and a controller for controlling so as to vary a height of the inner wall of the coil device.

The inner wall of the coil device is varied to have a height of 0 to 1.5 times a height of the coil, and an inductance of the coil has a range of 9.2 µH to 12.26 µH corresponding to the height of the coil.

The wireless charging device according to the present embodiment may further include a motor for varying the height of the inner wall.

The height of the inner wall may vary by stacking a pad corresponding to a width of the inner wall.

When the height of the inner wall is varied, the width of the inner wall may decrease.

The coil may be formed of two layers.

The outer wall may have a height corresponding to the height of the coil.

The shielding housing may include ferrite.

The wireless charging device according to the present embodiment may further include a storage part that stores information for variation of the inner wall corresponding to variation of the inductance of the coil.

Advantageous Effects

Effects of a coil device and a wireless charging device including the same according to the present embodiment will be described as follows.

The present embodiment may provide a coil device and a wireless charging device including the same.

The present embodiment may have an effect capable of realizing a standardization of a coil included in a wireless charging device and maximizing charging efficiency of the wireless charging device according thereto.

The present embodiment may have an effect capable of increasing variety of applications by adjusting an inductance value corresponding to diversification of a coil of a wireless charging device.

The present embodiment may have an effect of improving a process and material costs by controlling inductance using a shielding housing of a coil device.

The present embodiment may improve miss-matching of inductance, and may have an effect of reducing heat generation according thereto.

The effects expected in the present embodiment are not limited to the above-mentioned effects, and other effects not mentioned will be clearly understood by a person having an ordinary skill in the art to which the present embodiment pertains, from the following descriptions.

DESCRIPTION OF DRAWING PORTIONS

The accompanying drawings are provided to help in understanding of the present invention, and provide embodiments of the present invention together with the detailed description. However, the technical features of the present embodiment are not limited to a specific drawing, and the features disclosed in each drawing may be combined with each other to form a new embodiment.

FIG. 1 is a block diagram for describing a wireless charging system according to an embodiment.

FIG. 2. is a block diagram for describing a structure of a wireless power transmitter according to an embodiment.

MODES OF THE INVENTION

Figure 1:
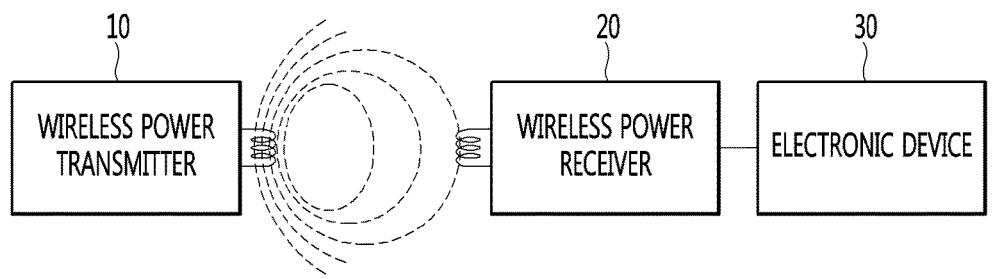

Hereinafter, apparatus and various methods according to embodiments will be described in detail with reference to the accompanying drawings. Suffixes "module" and "part" for elements used in the following descriptions are given or used just for convenience in writing the specification, and do not have meanings or roles distinguishable between them.

In describing the embodiments, if elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form.

In addition, it will be understood that the term "include", "comprise" or "have", etc. used as above means a presence of an element unless otherwise stated, and does not preclude the presence or addition of one or more other elements. Unless otherwise defined, all terms including technical and scientific terms used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Further, elements of the present disclosure may be described with terms first, second, A, B, (a), (b), etc. These terms are only used to distinguish one element from another, and do not limit the element's own meaning, sequence, order, etc. It will be understood that when an element is referred to as being "connected", "combined" or "coupled" to another element, it may be directly connected or coupled to the other element or intervening elements may be "connected", "combined" or "coupled" between the elements.

Furthermore, in the present disclosure, detailed descriptions of the related well-known art may be omitted if the well-known art is obvious to those skilled in the art and may cloud the gist of the present disclosure.

In describing embodiments, an apparatus for wirelessly transmitting electric power in a wireless power charging system will be called a wireless power transmitter, a wireless power transmission apparatus, a transmitting terminal, a transmitter, a transmitting apparatus, a transmitting side, a wireless power transmitting apparatus, a wireless power transmitter, a wireless charging apparatus, or the like, for convenience of description.

Further, an apparatus for wirelessly receiving electric power from the wireless power sending apparatus may be called a wireless power receiving apparatus, a wireless power receiver, a receiving terminal, a receiving side, a receiving apparatus, a receiver terminal, or the like, for convenience of description.

The wireless charging apparatus according to an embodiment may be provided as a pad type, a support type, an access point (AP) type, a small base station type, a stand type, a ceiling embedded type, a wall mount type, etc. and one transmitter may transmit electric power to a plurality of wireless power receiving apparatuses.

According to an embodiment, the wireless power receiver may employ at least one wireless power transmission manner, and may simultaneously receive wireless power from two or more wireless power transmitters. Herein, the wireless power transmission manner may include at least one among an electromagnetic induction manner, an electromagnetic resonance manner, and an RF wireless power transmission manner. In particular, the wireless power receiving means supporting the electromagnetic induction manner may include the wireless charging technology of the electromagnetic induction manner defined in the AirFuel Alliance (formerly PMA) and Wireless Power Consortium (WPC), i.e. wireless charging technology standard organizations. Further, the wireless power receiving means supporting the electromagnetic resonance manner may include the wireless charging technology of the resonance manner defined in the Airfuel (formerly A4WP) standard organization, i.e. wireless charging technology standard organization.

In general, the wireless power transmitter and the wireless power receiver of the wireless power system may exchange a control signal or information through in-band communication or Bluetooth low energy (BLE) communication. Herein, in-band communication and BLE communication may be performed by a pulse width modulation (PWM) method, a frequency modulation (FM) method, a phase modulation (PM) method, an amplitude modulation (AM) method, an AM-PM method, etc. For example, the wireless power receiver generates a feedback signal by applying a predetermined on/off switching pattern to an electric current induced through a reception coil and thus transmits various control signals and information to the wireless power transmitter. The information received from the wireless power receiver may include various pieces of information such as a strength of received power. In this case, the wireless power transmitter may calculate a charging efficiency or a power transmission efficiency based on information about the strength of the received power.

FIG. 1 is a block diagram for describing a wireless charging system according to an embodiment.

Referring to FIG. 1, the wireless charging system may generally include a wireless power transmitter 10 for wirelessly transmitting power, a wireless power receiver 20 for receiving the transmitted power, and an electronic device 30 to which the received power is supplied.

For example, the wireless power transmitter 10 and the wireless power receiver 20 may perform in-band communication for exchanging information using the same frequency band as an operation frequency used in wireless power transmission. As another example, the wireless power transmitter 10 and the wireless power receiver 20 may perform out-of-band communication for exchanging information using another frequency band different from the operation frequency used in wireless power transmission.

As an example, the information exchanged between the wireless power transmitter 10 and the wireless power receiver 20 may include not only state information of each other but also control information.

Here, the state information and the control information exchanged between the transmitting and receiving terminals be further clarified by descriptions of embodiments described later.

The in-band communication and the out-of-band communication may provide bidirectional communication, but are not limited thereto, and in other embodiments, one-way communication or half-duplex communication may be provided.

As an example, one-way communication may refer that the wireless power receiver 20 transmits information only to the wireless power transmitter 10, but is not limited thereto, and may refer that the wireless power transmitter 10 transmits information to the wireless power receiver 20.

The half-duplex communication method allows bidirectional communication between the wireless power receiver 20 and the wireless power transmitter 10, but allows to transmit information by only one device at any a time point.

The wireless power receiver 20 according to an embodiment may acquire various state information of the electronic device 30. As an example, the state information of the electronic device 30 may include current power usage information, information for identifying running applications, usage rate information of a central processing unit (CPU), battery charge status information, battery output voltage/current information, etc., but the present embodiment is not limited thereto, and any information that may be acquired from the electronic device 30 and may be used for wireless power control is sufficient.

Figure 2:
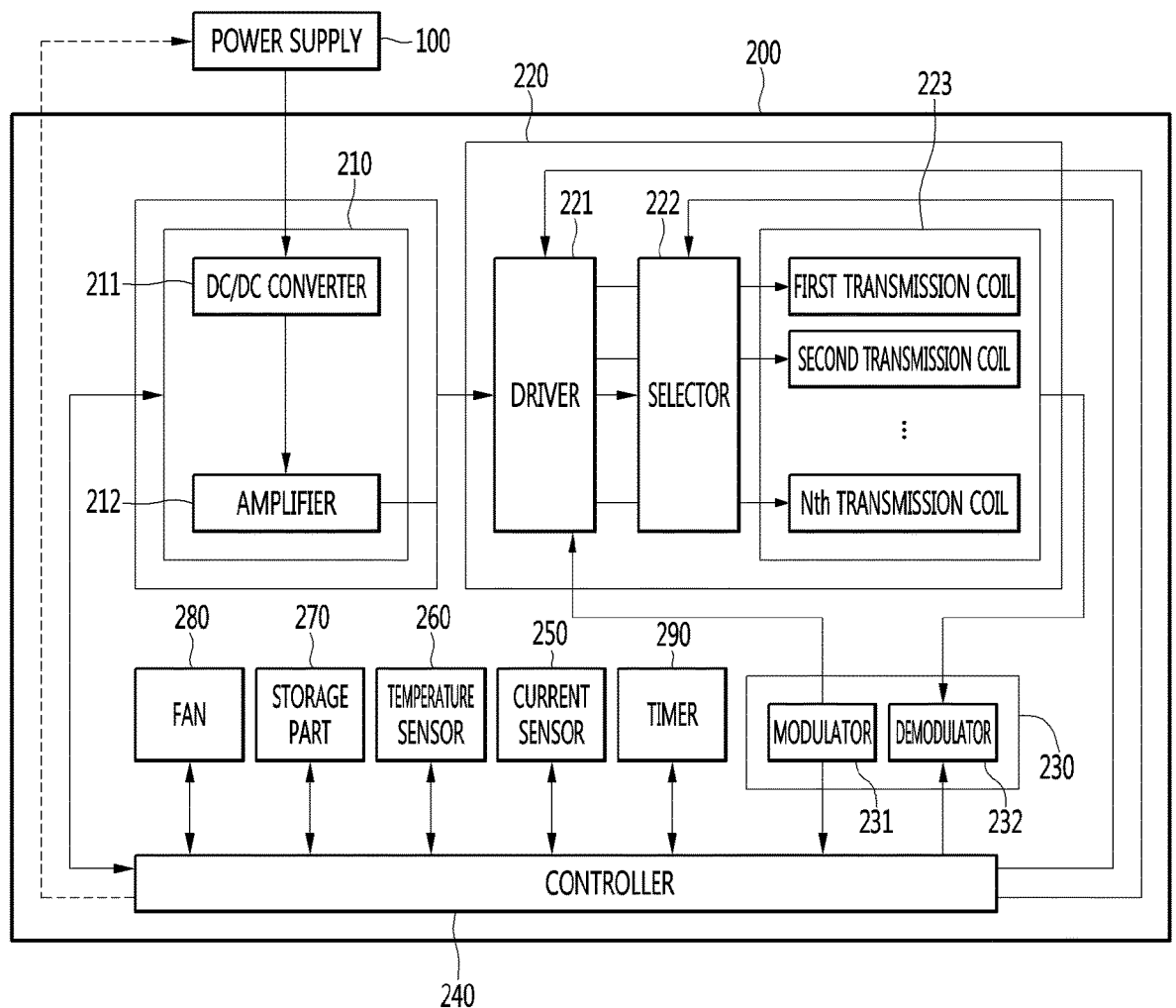

FIG. 2 is a block diagram for describing a structure of a wireless power transmitter according to an embodiment.

Referring to FIG. 2, a wireless power transmitter 200 may include a power converter 210, a power transmitter 220, a wireless charging communicator 230, a controller 240, a current sensor 250, a temperature sensor 260, a storage part 270, a fan 280, and a timer 290, largely. The configuration of the wireless power transmitter 200 is not an essential configuration, and thus it should be noted that it is possible to include more or less elements than these elements.

As shown in FIG. 2, a power supply 100 may provide supply power. The power supply 100 may correspond to a battery built in the wireless power transmitter 200, or may be an external power source. The embodiment is not limited to a type of the power supply 100.

When receiving power from a power supply 260, the power converter 210 may perform a function for converting the power into power having a predetermined strength.

To this end, the power converter 210 may include a DC/DC converter 211 and an amplifier 212.

The DC/DC converter 211 may perform a function of converting DC power supplied from the power supply 260 into DC power having a specific strength in accordance with a control signal of the controller 240.

The amplifier 212 may adjust a strength of DC/DC converted power in accordance with the control signal of the controller 240. As an example, the controller 240 may receive power receiving state information of a wireless power receiver and/or a power control signal through the wireless charging communicator 230, and dynamically adjust an amplification rate of the amplifier 212 based on the received power receiving state information and/or the received power control signal. As an example, the power receiving state information may include strength information on an output voltage of a rectifier, strength information on a current applied to a reception coil, etc., but the present embodiment is not limited thereto. The power control signal may include a signal for requesting an increase in the power, a signal for requesting a decrease in the power, and the like.

The current sensor 250 may measure an input current input to a driver 221. The current sensor 250 may provide the measured input current value to the controller 240. More specifically, the current sensor 250 may sense the input current input to the driver 221 of the power transmitter 220 to provide the sensed voltage to the controller 240. The input current may be a rail current Ir. The rail current Ir may be a current flowing from the power converter 210 to the driver 221. The rail current Ir is not limited thereto, and may be a current flowing from the power supply 100 to the driver 221 when the driver 221 receives power directly from the power converter 210 through the power supply 100.

The controller 240 may determine a charging state of the wireless power receiver based on the input current value measured by the current sensor 250. That is, the controller 240 may determine the charging state of the wireless power receiver through a change of the input current. The charging state of the wireless power receiver may include a plurality of charging states. The plurality of charging states of wireless power receiver may include first to fourth charging states. In addition, as the input current, first to sixth currents may flow according to the first to fourth charging states. More specifically, in the first charging state of the wireless power receiver, wireless charging may be performed in a general charging mode, a medium power charging mode, or a fast charging mode.

That is, the first charging state of the wireless power receiver may be a state in which charging power by the wireless power receiver is not limited according to a power transmission contract. In the first charging state of the wireless power receiver, the first current may flow as an input current of the wireless power transmitter.

The second charging state of the wireless power receiver may be a state in which the wireless power receiver reaches a predetermined temperature at a predetermined battery charging rate or less and charging power is limited. In the second charging state of the wireless power receiver, the second current may flow as the input current of the wireless power transmitter.

The third charging state of the wireless power receiver may be a state in which the wireless power receiver reaches a predetermined temperature at a predetermined battery charging rate or more and wireless charging is interrupted. In the third charging state of the wireless power receiver, the third current may flow as the input current of the wireless power transmitter.

The fourth charging state of the wireless power receiver may be a state in which battery charging reaches a predetermined charging rate close to fullness and the wireless power receiver adjusts charging power stepwise. In the fourth charging state of the wireless power receiver, the fourth to sixth currents may flow in order as the input current of the wireless power transmitter.

In addition, the controller 240 according to the present embodiment may control variation of a shielding housing for varying an inductance of a transmission coil 223 of the wireless power transmitter 200. The controller 240 may generate a control signal for adjusting an area or height of an inner wall constituting the shielding housing based on an inductance value of the coil and a control value of the shielding housing stored in the storage part 270. In particular, the present invention may include a driver that may control variation of a height or width of the shielding housing, such as a motor (not shown). Therefore, the controller may generate a control signal for controlling the driver.

The temperature sensor 260 may measure an internal temperature of the wireless power transmitter 200, and may provide a measurement result to the controller 240. More specifically, the temperature sensor 260 may include one or more temperature sensors. The one or more temperature sensors may be disposed corresponding to a transmission coil 223 of the power transmitter 220 to measure a temperature of the transmission coil 223. As an example, the controller 240 may adaptively cut off power supplied from the power supply 100 or prevent the power from being supplied to the amplifier 212 on the basis of a temperature value measured by the temperature sensor 260. To this end, a predetermined power cut-off circuit for cutting off power supplied from the power supply 100 or cutting off power supplied to the amplifier 212 may be further provided at one side of the power converter 210. As another example, the controller 240 may adjust a strength of the power provided to the power transmitter 220 based on the temperature value measured by the temperature sensor 260.

The power transmitter 220 serves to transmit the power signal output from the power converter 210 to the wireless power receiver. To this end, the power transmitter 220 may include a driver 221, a selector 222, and one or more transmission coils 223.

The driver 221 may generate an AC power signal in which an AC component having a specific frequency is inserted into a DC power signal output from the power converter 210 to transmit the AC power signal to the transmission coil 223. In this case, frequencies of AC power signals that are transmitted to a plurality of transmission coils included in the transmission coil 223 may be the same or different from each other.

The selector 222 may receive the AC power signal having the specific frequency from the driver 221 to transmit the AC power signal to a transmission coil selected from the plurality of transmission coils. Here, the selector 222 may control the AC power signal to be transmitted to the transmission coil selected by the controller 240 according to a predetermined control signal of the controller 240. More specifically, the selector 222 may include a switch that connects an LC resonant circuit corresponding to the plurality of transmission coils 223. The present embodiment is not limited thereto, and the selector 222 may be excluded from the power transmitter 220 when the transmission coil 223 is configured by one transmission coil.

The transmission coil 223 may include at least one transmission coil, and may transmit the AC power signal received from the selector 222 to a receiver through a corresponding transmission coil. When the transmission coil is in plural, the transmission coils 223 may include first to nth transmission coils. In order to select a 'corresponding transmission coil' from among the plurality of transmission coils, the selector 222 may be realized as a switch or a multiplexer (not shown).

The transmission coil according to the present embodiment may be wound such that a hollow portion is formed, and the inner wall of the shielding housing may be formed so as to correspond to the hollow portion. At this time, the height or width of the inner wall is varied by a control of the controller 240, and an inductance of the transmission coil may be changed accordingly.

A modulator 231 may modulate the control signal generated by the controller 240 and transmit it to the driver 221. Here, a method of modulating the control signal may include a frequency shift keying (FSK) modulation method, a Manchester coding modulation method, a phase shift keying (PSK) modulation method, a pulse width modulation (PWM) method, a differential bi-phase modulation method, and the like, but the present embodiment is not limited thereto.

When sensing a signal received through the transmission coil, the demodulator 232 demodulates the sensed signal and transmits it to the controller 240. Herein, the demodulated signal may include a signal strength indicator, an error correction (EC) indicator for controlling power during the wireless power transfer, an end-of-charge (EOC) indicator, an overvoltage/overcurrent/overheat indicator, and the like, but the present embodiment is not limited thereto, and may include various pieces of status information for identifying the state of the wireless power receiver.

In addition, the demodulator 232 may identify which transmission coil the demodulated signal is received from, and may provide a predetermined transmission coil identifier corresponding to the identified transmission coil to the controller 240.

As an example, the wireless power transmitter 200 may obtain the signal strength indicator through in-band communication that uses the same frequency used for wireless power transmission to communicate with the wireless power receiver.

In addition, the wireless power transmitter 200 may not only transmit the wireless power using the transmission coil 223, but may also exchange various pieces of information with the wireless power receiver via the transmission coil 223. As another example, the wireless power transmitter 200 may additionally include a separate coil corresponding to each of the transmission coils 223—i.e., the first to nth transmission coils—, and it should be noted that the in-band communication may be performed with the wireless power receiver by using the included separate coil.

The storage part 270 may store an input current value of the wireless power transmitter according to the charging state of the wireless power receiver, a charging power strength, whether or not charging is interrupted, a temperature of the wireless power transmitter for restarting charging, a time after charging is stopped for restarting charging, and the like. In particular, the storage part 270 may store variable height information of the inner wall for varying the inductance of the transmission coil according to the embodiment. Specifically, the storage part 270 may store variable values (height, width) that may vary the height or width of the inner wall of the shielding housing according to an inductance value required from the transmission coil.

The fan 280 may be rotated by the motor to cool an overheated wireless power transmitter 200. The fan 280 may be disposed corresponding to a configuration in which a degree of overheating is severe. For example, the fan 280 may be disposed corresponding to the power transmitter 220. More specifically, the fan 280 may be disposed corresponding to the transmission coil 223 of the power transmitter 220.

Figure 3:
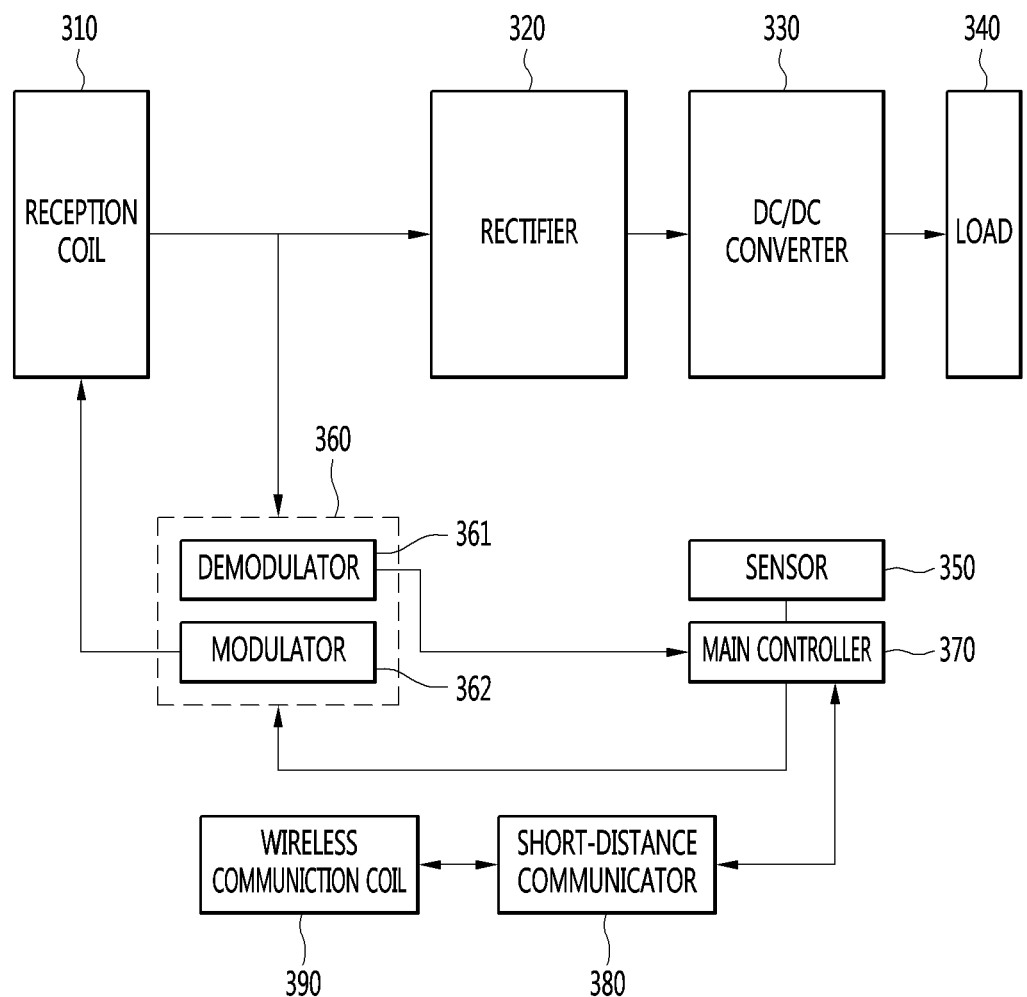
FIG. 3 is a block diagram for describing a structure of a wireless power receiver interworking with the wireless power transmitter according to FIG. 2.

FIG. 3 is a block diagram for describing a structure of a wireless power receiver interworking with the wireless power transmitter according to FIG. 2.

Referring to FIG. 3, a wireless power receiver 300 may include a reception coil 310, a rectifier 320, a DC/DC converter 330, a load 340, a sensor 350, a communicator 360, and a main controller 370. Here, the communicator 360 may include at least one of a demodulator 361 and a modulator 362.

The wireless power receiver 300 shown in an example of FIG. 3 is shown to be able to exchange information with the wireless power transmitter via in-band communication, but this is merely one embodiment, and the communicator 360 according to another embodiment may provide short-distance bidirectional communication via a frequency band different from the frequency band used for transmitting a wireless power signal.

AC power received via the reception coil 310 may be transferred to the rectifier 320. The rectifier 320 may convert the AC power into DC power and transmit it to the DC/DC converter 330. The DC/DC converter 330 may convert a strength of the DC power output from the rectifier into a specific strength required by the load 340, and then may transfer it to the load 340. In addition, the reception coil 310 may include a plurality of reception coil (not shown), that is, first to nth reception coils. Frequencies of the AC power transmitted to each of the reception coils (not shown) according to one embodiment may be different from each other, and in another one embodiment, the resonance frequency for each reception coil may be set to be different by using a predetermined frequency controller having a function of adjusting LC resonance characteristics to be different for each reception coil.

In particular, the reception coil 310 according to the present embodiment may be wound to include a hollow portion, and an inner wall of the shielding housing may be formed so as to correspond to the hollow portion, and thus an inductance of the reception coil may be changed by variation of the inner wall.

The sensor 350 may measure the strength of the DC power output from the rectifier 320, and may provide it to the main controller 370. In addition, the sensor 350 may measure intensity of a current applied to the reception coil 310 in accordance with reception of the wireless power, and may transmit the measured result to the main controller 370. Further, the sensor 350 may measure an internal temperature of the wireless power receiver 300, and may provide a measured temperature value to the main controller 370.

As an example, the main controller 370 may compare the measured strength of the DC power output from the rectifier with a predetermined reference value to determine whether an overvoltage occurs or not. As a result of the determination, when the overvoltage occurs, the main controller 370 may generate a predetermined packet notifying that the overvoltage has occurred to transmit it to the modulator 362. Here, a signal modulated by the modulator 362 may be transmitted to the wireless power transmitter via the reception coil 310 or a separate coil (not shown). In addition, when the strength of the DC power output from the rectifier is equal to or higher than the predetermined reference value, the main controller 370 may determine that a sensing signal is received, and may control such that a signal strength indicator corresponding to the sensing signal may be transmitted to the wireless power transmitter via the modulator 362 when the sensing signal is received. As another example, the demodulator 361 may modulate an AC power signal or a DC power signal output from the rectifier 320 between the reception coil 310 and the rectifier 320 to identify whether a sensing signal is received or not, and then may provide the identification result to the main controller 370. At this time, the main controller 370 may control such that the signal strength indicator corresponding to the sensing signal may be transmitted via the modulator 362.

In addition, the reception coil 310 may be disposed in the main controller 370 for varying of the inductance of the reception coil 310, and the main controller 370 may generate a control signal for varying the inner wall of the shielding housing disposed so as to correspond to the hollow portion of the reception coil 310. In particular, the wireless power receiver may include a driver that may vary a standard of the inner wall, such as a motor (not shown). Therefore, the main controller 370 may generate an operation signal of the motor to control for varying a width or height of the inner wall. At this time, the main controller 370 may control an operation of the driver based on the inductance of the reception coil 310 stored in a storage part (not shown) and variable information of the inner wall corresponding thereto.

Hereinafter, a configuration and operation of a coil device disposed in a wireless charging device including a wireless power transmitter and a wireless power receiver according to the present embodiment will be described in detail with reference to the accompanying drawings.

Figure 4:
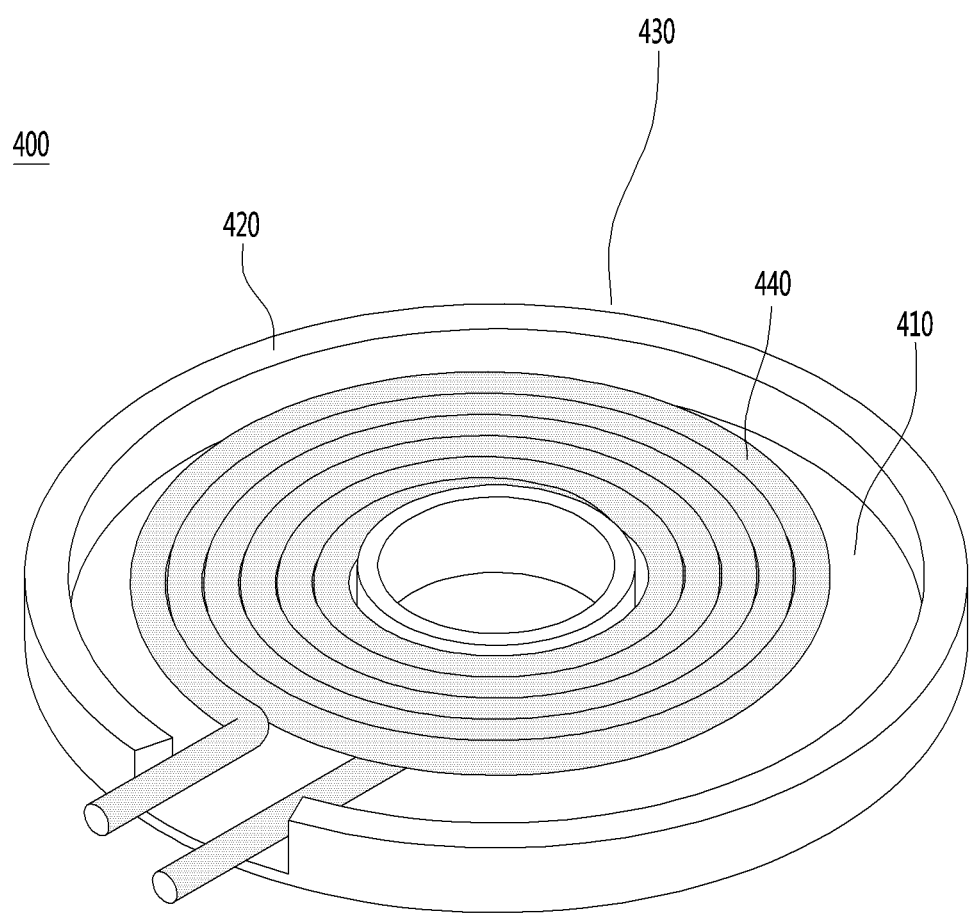
FIG. 4 is a perspective view of a coil device according to the present embodiment.
Figure 5:
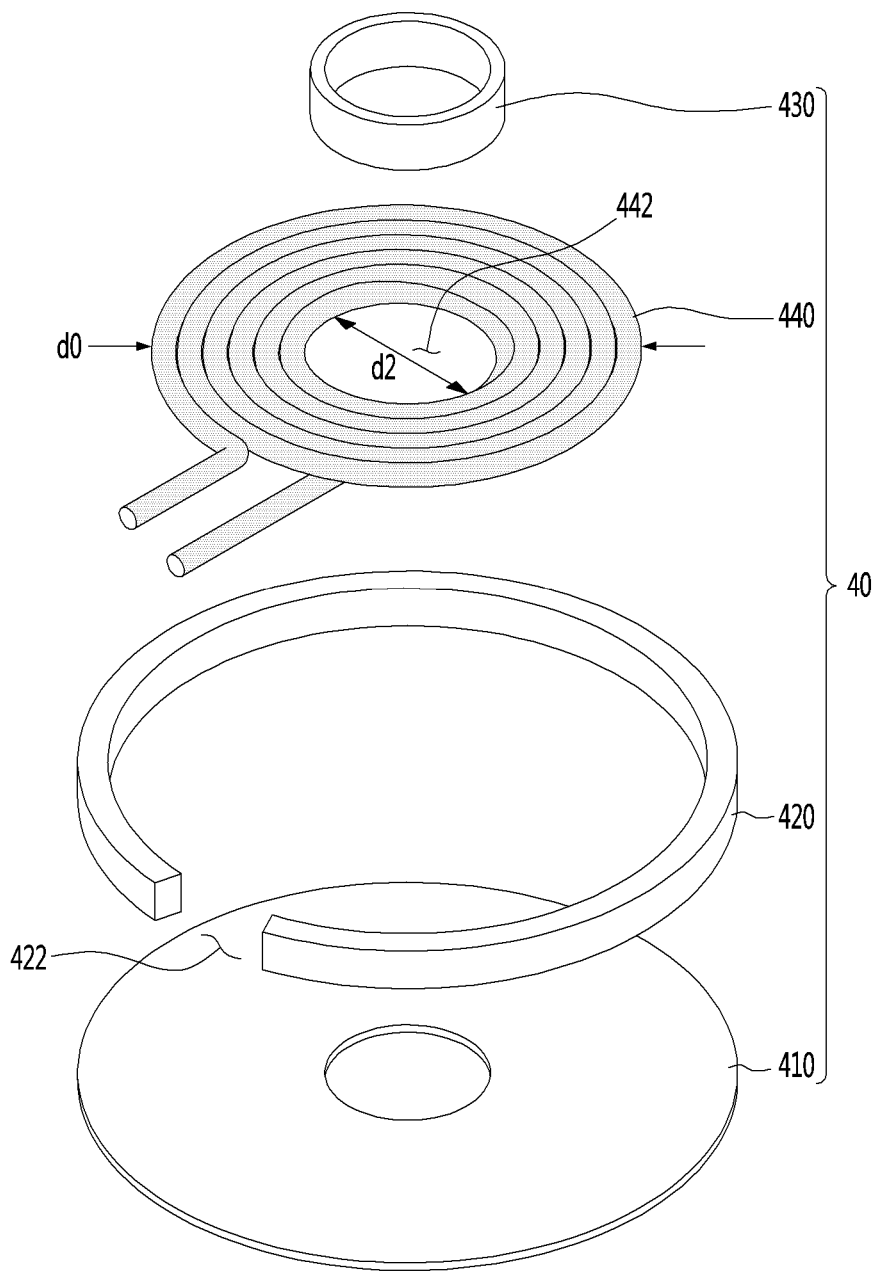
FIG. 5 is an exploded perspective view of the coil device according to the present embodiment.
Figure 6:
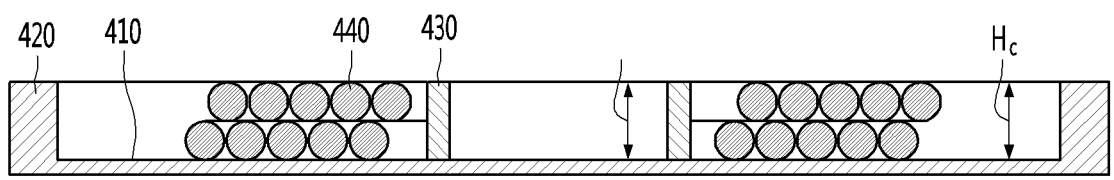
FIG. 6 is a side perspective view of the coil device according to the present embodiment.

FIG. 4 is a perspective view of a coil device according to the present embodiment, FIG. 5 is an exploded perspective view of the coil device according to the present embodiment, and FIG. 6 is a side perspective view of the coil device according to the present embodiment.

Referring to FIGS. 4 to 6, a coil device 400 according to the present embodiment may include a coil 440 and a shielding housing 40 in which the coil 440 is disposed. For example, the coil 440 may be wound N times such that a hollow portion 442 is formed. For example, the coil 440 may be wound 6.5 times to form two layers. In addition, a diameter di of the hollow portion 442 of the coil 440 may be formed at about 20.5 mm to about 21.5 mm, a diameter do of the coil 440 may be formed at about 39 mm to about 43 mm. However, a standard of the coil 440 is not limited and may be variously set according to the embodiment or the standard.

The shielding housing 40 in which the coil 440 is disposed to be accommodated may include a flat part 410 on which the coil 440 is disposed, an inner wall 430 corresponding to a shape of the hollow portion 442 of the coil 440, and an outer wall 420 corresponding to an outer circumferential shape of the coil 440.

For example, the shielding housing 40 may form a flat part 410 on which the coil 440 is disposed, and the flat part 410 may be formed in a shape in which the coil 440 is wound.

The shielding housing 40 may have an outer wall 420 formed along an outer region or an edge region of the flat part 410. The outer wall 420 may extend from the flat part 410 to be formed to have a height covering the outer region of the coil 440. For example, the outer wall 420 may be spaced apart from the outer region of the coil 440 by a critical distance so as not to contact the outer region of the coil 440 to be formed to surround the flat part 410. In addition, the outer wall 420 may form a leading groove 422 such that one side of the wound coil 440 may be drawn out to one side.

The shielding housing 40 may include the inner wall 430 formed at a position corresponding to the hollow portion 442 of the coil 440. For example, the inner wall 430 may protrude vertically from the flat part 410 on which the coil 440 to be formed at a position corresponding to the hollow portion 442 of the coil 440. The inner wall 430 may be formed to have a height HI of 0 to 1.5 times so as to correspond to a height Hc of the coil 440. That is, the inner wall 430 may be varied in height in order to vary an inductance of the coil 440 according to wireless charging efficiency.

For example, the inductance of the coil 440 that is varied to correspond to variation of the height HI of the inner wall 430 may be 9.2 µH to 12.26 µH. That is, when the height HI of the inner wall 430 increases to 0 to 1.5 times the height Hc of the coil 440, the inductance of the coil 440 may increase to 9.2 µH to 12.26 µH to correspond to the height HI of the variable inner wall 430. In this case, a case in which the height HI of the inner wall 430 is 0 times the height Hc of the coil 440 means that the inner wall 430 is not formed. This is a case in which an upper surface of the inner wall 430 is disposed on one plane with an upper surface of the flat part 410. That is, the upper surface of the inner wall 430 and the upper surface of the flat part 410 may be horizontally aligned.

Hereinafter, variation of an inductance of the coil 440 according to the height of the inner wall 430 of the shielding housing 40 will be described in detail with reference to FIGS. 7 to 10.

FIGS. 7 to 10 are perspective views for describing variation of a shielding housing for controlling an inductance value of a coil device according to the present embodiment.

Referring to FIGS. 7 to 10, FIGS. 7 to 10 show variation of an inductance corresponding to the height Hi of the inner wall, when a height Hi of an inner wall of a shielding housing is varied to 0 to 1.5 times a height Hc of a coil.

Table 1 below shows a relationship between inductance and resistance values according to the height of the inner wall of the shielding housing. In the present embodiment, a case in which a height of a single wire coil is about 1.1 mm, the single wire coil is a coil stacked in two layers, the height Hc of the coil is about 2.2 mm, and the height Hi of the inner wall is about 0 mm to about 3.3 mm will be described as an example.

TABLE 1

Figure 7:
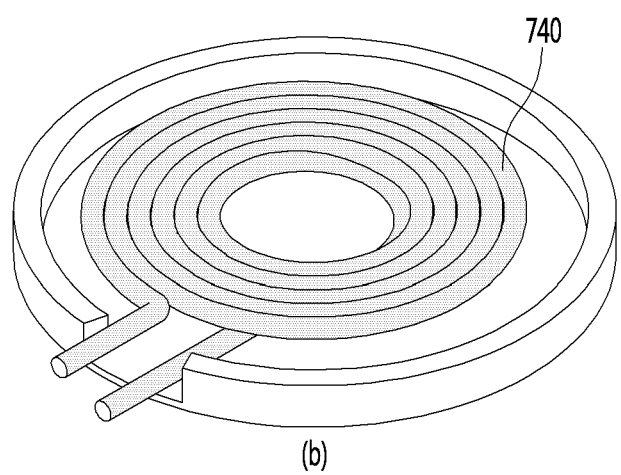
FIGS. 7 to 10 are perspective views for describing variation of a shielding housing for controlling an inductance value of the coil device according to the present embodiment.
Figure 7:
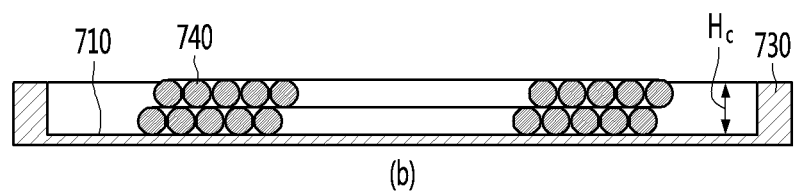
Figure 8:
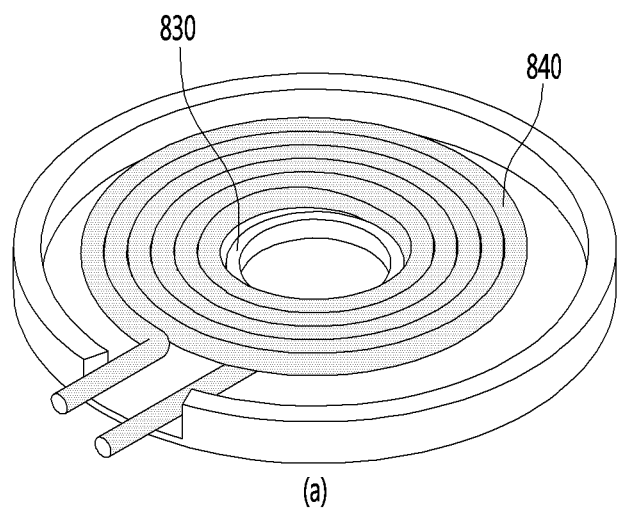
Figure 8:
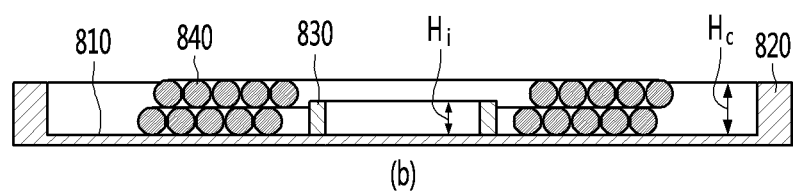
Figure 9:
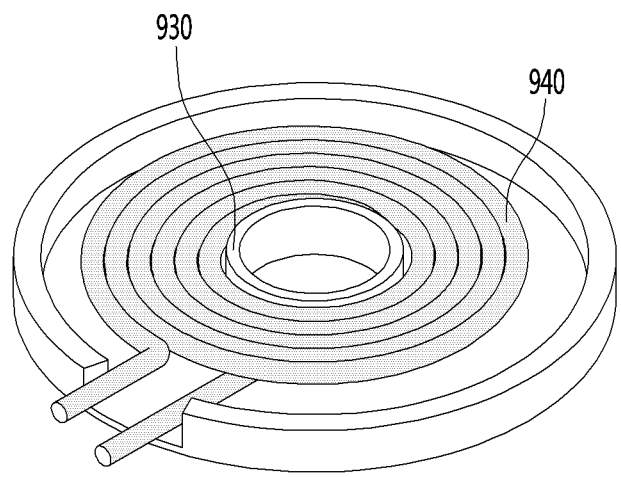
Figure 9:
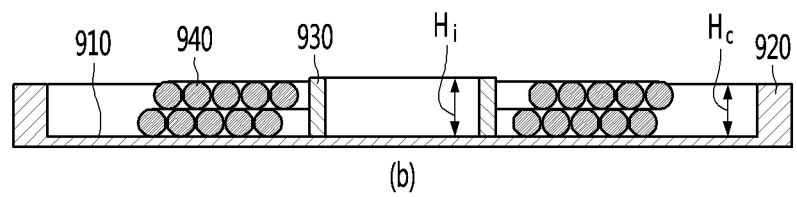
Figure 10:
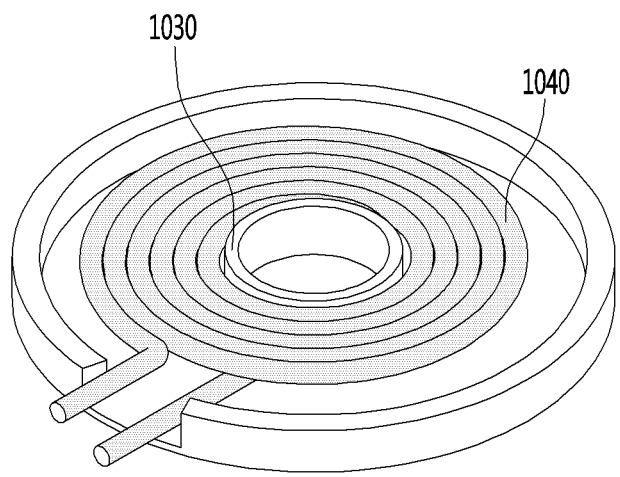
Figure 10:
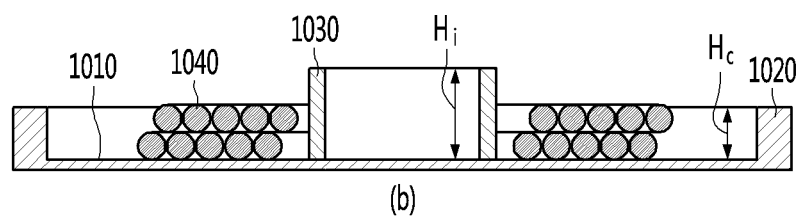

| | | 100 KHz | |
| --- | --- | --- | --- |
| Drawing | Height of inner wall (Hi) (mm) | Inductance (L) (µH) | Resistance (R) (Ω) |
| FIG. 7 | 0 | 9.20 | 0.033 |
| FIG. 8 | 1.3 | 10.35 | 0.034 |
| FIG. 9 | 2.3 | 11.08 | 0.032 |
| FIG. 10 | 3.3 | 12.26 | 0.031 |

FIG. 7 is an exemplary view showing a case in which the height of the inner wall of the shielding housing is 0 times the height Hc of the coil, that is, 0 mm. In the shielding housing, a coil 740 may be disposed on a flat part 710, and an outer wall 720 may extend from the flat part 710 to be formed to correspond to the height of the coil 740. As shown in an exemplary view of FIG. 7B, the inner wall may be not formed in a hollow portion 742 of the coil 740. In this case, since the height Hi of the inner wall is 0 mm and the height of the inner wall is not formed, the inductance of the coil 740 may be 9.2 µH.

In addition, FIG. 8 is an exemplary view showing a case in which the height of the inner wall is about 1.3 mm when the height of the inner wall of a shielding housing is lower than that of a coil.

In the shielding housing, a coil 840 may be disposed on a flat part 810, and an outer wall 820 may extend from the flat part 810 to be formed to correspond to the height of the coil 840. As shown in FIG. 8B, an inner wall 830 may be formed in a hollow portion 842 of the coil 840. The inner wall 830 may extend from the flat part 810 of the shielding housing to be formed to protrude upward of the shielding housing. The height Hi of the inner wall 830 is about 1.3 mm, and may be formed to be lower than about 2.2 mm which is the height Hc of the coil 840. In this case, the inductance of the coil 840 according to the height Hi of the inner wall 830 may be 10.35 µH.

In addition, FIG. 9 is an exemplary view showing a case in which the height of the inner wall is about 2.3 mm when the height of the inner wall of a shielding housing is similar to that of a coil.

In the shielding housing, a coil 940 may be disposed on a flat part 910, and an outer wall 920 may extend from the flat part 910 to be formed to correspond to the height of the coil 940. As shown in FIG. 9B, an inner wall 930 may be formed in a hollow portion 942 of the coil 940. The inner wall 930 may extend from the flat part 910 of the shielding housing to be formed to protrude upward of the shielding housing. The height Hi of the inner wall 930 is about 2.3 mm, and may be formed to be similar to about 2.2 mm which is the height Hc of the coil 940. In this case, the inductance of the coil 940 according to the height Hi of the inner wall 930 may be 11.08 µH.

In addition, FIG. 10 is an exemplary view showing a case in which the height of the inner wall is about 3.3 mm when the height of the inner wall of a shielding housing is higher than that of a coil.

In the shielding housing, a coil 1040 may be disposed on a flat part 1010, and an outer wall 1020 may extend from the flat part 1010 to be formed to correspond to the height of the coil 1040. As shown in FIG. 10B, an inner wall 1030 may be formed in a hollow portion 1042 of the coil 1040. The inner wall 1030 may extend from the flat part 1010 of the shielding housing to be formed to protrude upward of the shielding housing. The height Hi of the inner wall 1030 is about 3.3 mm, and may be formed to be higher than about 2.2 mm which is the height Hc of the coil 1040. In this case, the inductance of the coil 1040 according to the height Hi of the inner wall 1030 may be 12.26 µH.

As described above, the inner wall formed on the shielding housing and inserted into the hollow portion of the coil may be formed to have a height of 0 to 1.5 times to correspond to the height of the coil, and the inductance of the coil may be varied to correspond to the height of the inner wall. In the present embodiment, the height of the coil and the height of the inner wall according to the height of the coil are defined to describe. However, such a standard is not limited, and in the shielding housing having the inner wall, it may be defined so that the inductance of the coil may be varied by making the inner wall variable according to the height of the coil.

Hereinafter, various embodiments in which the inner wall is varied according to the present embodiment will be described in detail with reference to FIGS. 11 to 14.

Figure 11:
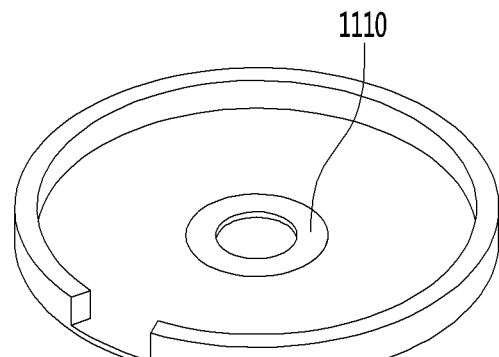
FIG. 11 is an exemplary view for describing a variable state of an inner wall of a shielding housing according to one embodiment.
Figure 11:
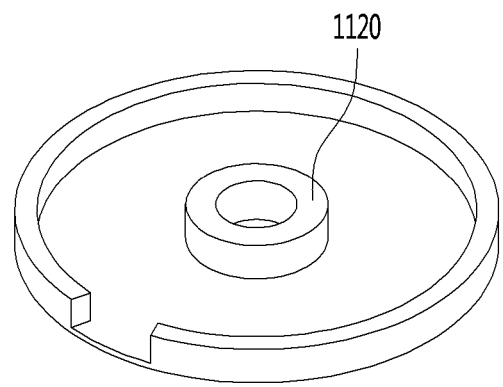
Figure 11:
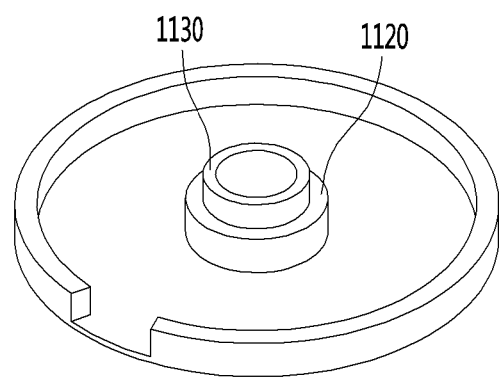

FIG. 11 is an exemplary view for describing a variable state of an inner wall of a shielding housing according to one embodiment.

Referring to FIG. 11, a case will be described in which an inner wall 1110 of FIG. 11 operates by driving by a driver (not shown) such as a motor in order to change a height of the inner wall 1110.

Specifically, an exemplary view of FIG. 11A shows an example of a case in which the height of the inner wall 1110 is 0 mm, and an upper surface of the inner wall may be formed at the same height as an upper surface of a flat part of the shield material.

Meanwhile, an exemplary view of FIG. 11B shows a case in which an inner wall 1120 has risen to a predetermined height as compared with the exemplary view of FIG. 11A, and the height of the inner wall may be risen by driving of a driver. The height at which the inner wall rises may be varied at the predetermined height to correspond to an inductance of a coil to be varied.

In addition, an exemplary view of FIG. 11C shows a case in which a predetermined height is increased upward in addition to the height of the inner wall 1120 of the exemplary view of FIG. 11B. At this time, a raised inner wall 1130 may be increased to the predetermined height to correspond to an inductance of a coil. In particular, the height of the inner wall increases, but a width of the inner wall may be the same, or may be increased or decreased. The exemplary view of FIG. 11C shows an example of a case in which the width decreases as the height of the inner wall increases.

Meanwhile, in FIG. 12, another embodiment for varying a height of an inner wall will be described.

Figure 12:
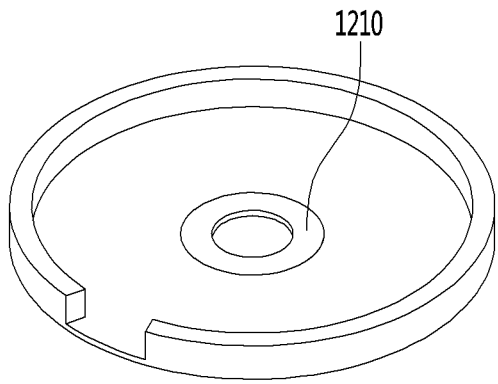
FIG. 12 is an exemplary view for describing a variable state of an inner wall of a shielding housing according to another embodiment.
Figure 12:
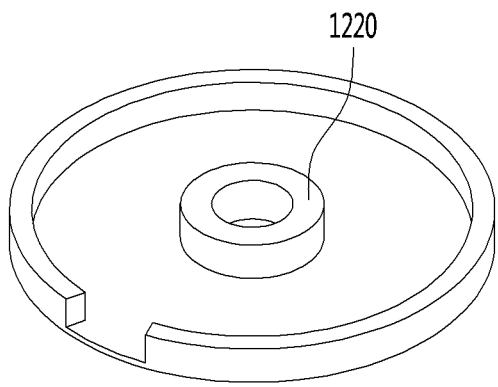
Figure 12:
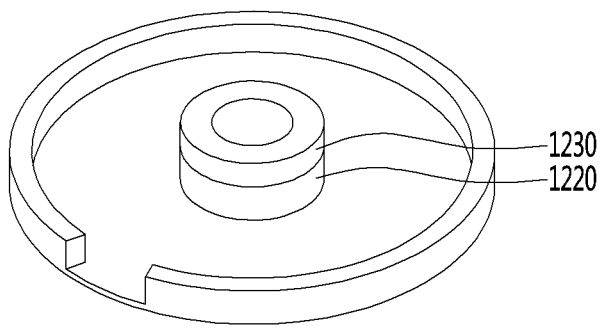

FIG. 12 is an exemplary view for describing a variable state of an inner wall of a shielding housing according to another embodiment.

Referring to FIG. 12, a variation of the inner wall according to another embodiment is a case in which a pad equal to a width of the inner wall is stacked to vary. The pad is made of the same material as the inner wall, and when the height of the inner wall is to be varied according to an inductance of a coil, the pads may be stacked according to the height of the inner wall.

Specifically, an exemplary view of FIG. 12A shows an example of a case in which a height of an inner wall 1210 is 0 mm, and an upper surface of the inner wall may be formed at the same height as an upper surface of a flat part of the shield material.

Meanwhile, an exemplary view of FIG. 12B shows a case in which an inner wall 1220 has risen to a predetermined height as compared with the exemplary view of FIG. 12A, and shows a structure in which a pad having a width corresponding to the inner wall 1220 is stacked. The height of the inner wall 1220 may be stacked at the predetermined height to correspond to an inductance of a coil to be varied.

In addition, an exemplary view of FIG. 12C shows a case in which a predetermined height is increased upward in addition to the height of the inner wall 1220 of the exemplary view of FIG. 12B. At this time, a raised inner wall 1230 may be increased to the predetermined height to correspond to an inductance of a coil. In particular, in another embodiment, a case will be described in which when the height of the inner wall rises, only the height varies at the same width of the inner wall. However, the embodiment is not limited thereto, and pads with different widths and heights may be stacked to be formed as the inner wall.

Figure 13:
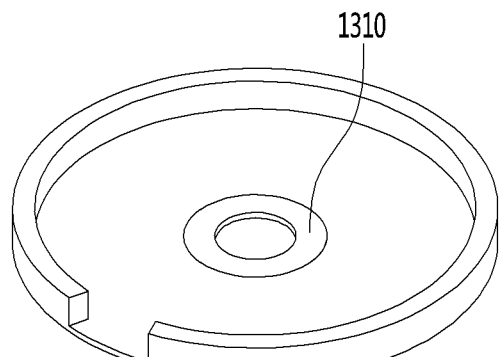
FIG. 13 is an exemplary view for describing a variable state of an inner wall of a shielding housing according to still another embodiment.
Figure 13:
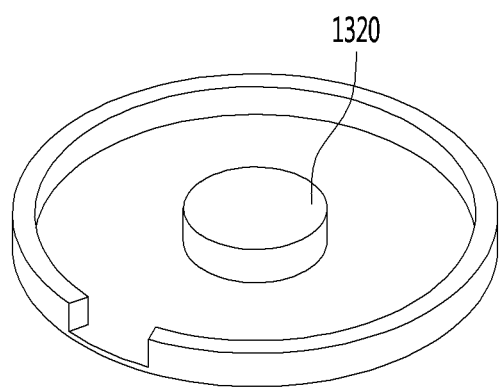
Figure 13:
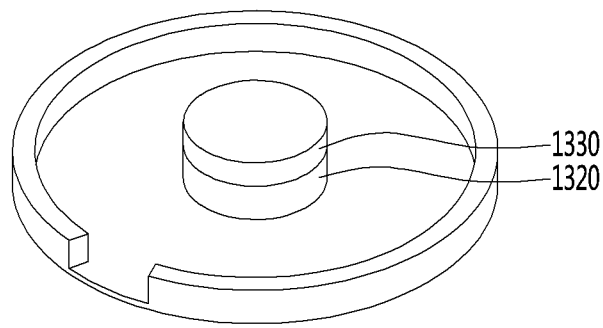

In addition, FIG. 12 shows a case in which a hollow portion of the inner wall is formed to have an air core, but FIG. 13 shows a case in which the hollow portion of the inner wall has no air core, and is formed in a cylindrical shape.

Specifically, FIG. 13 is an exemplary view for describing a variable state of an inner wall of a shielding housing according to still another embodiment.

Referring to FIG. 13, an exemplary view of FIG. 13A shows an example of a case in which a height of an inner wall 1310 is 0 mm, and an upper surface of the inner wall may be formed at the same height as an upper surface of a flat part of the shield material.

Meanwhile, exemplary views of FIGS. 13B and 13C show a case in which inner walls 1320 and 1330 are stacked in a cylindrical shape and a height of an inner wall is varied.

Figure 14:
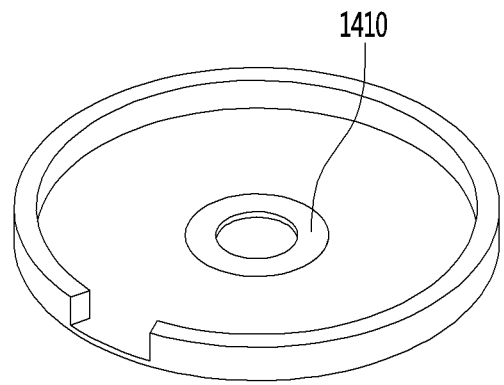
FIG. 14 is an exemplary view for describing a variable state of an inner wall of a shielding housing according to still another embodiment.
Figure 14:
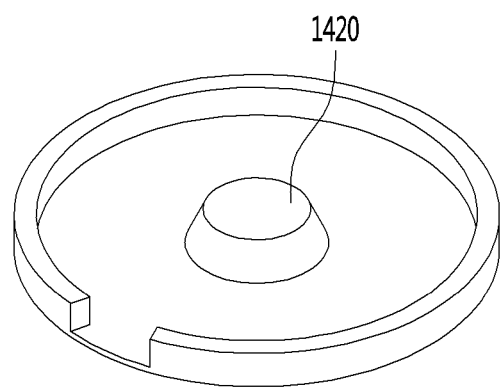
Figure 14:
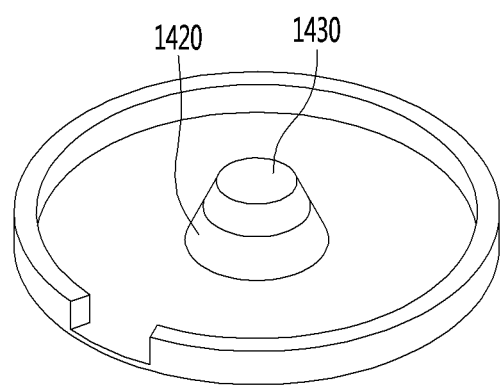

In FIGS. 11 to 13, a case in which the height is varied in a shape in which the inner wall has a cylindrical shape is described, but the embodiment is not limited thereto, and as shown in FIG. 14, inner walls having various shapes may be formed.

FIG. 14 is an exemplary view for describing a variable state of an inner wall of a shielding housing according to still another embodiment.

Referring to FIG. 14, it will be described in still another embodiment that the inner wall of the shielding housing may be formed in various shapes such as a conical shape instead of the cylindrical shape described above.

Specifically, an exemplary view of FIG. 14A shows an example of a case in which a height of an inner wall 1410 is 0 mm, and an upper surface of the inner wall may be formed at the same height as an upper surface of a flat part of the shield material.

Meanwhile, in exemplary views of FIGS. 14B and 14C, when a height of an inner wall is varied, inner walls 1420 and 1430 may have a shape that increases in height but decreases in width, such as a conical shape.

As described above, in the present embodiment, an inner wall is formed to correspond to a hollow portion region of a coil wound to form a hollow portion, and it is possible to obtain an effect that an inductance of the coil is changed by varying the height of the inner wall. Therefore, it is possible to obtain an effect that a standard required at the time of wireless power transmission/reception may be easily varied.

The method according to the above-described embodiment may be produced as a program for execution on a computer and stored in a computer readable recording medium, and examples of the computer readable recording medium include a ROM, a RAM, a CD-ROM, a magnetic tape, a floppy disk, optical data storage devices, and the like, and also include implementation in the form of a carrier wave (for example, transmission via the Internet).

The computer readable recording medium may be distributed in computer systems connected via a network and the computer readable code may be stored and executed in a distributed manner. Also, functional programs, codes and code segments for implementing the above-described method may be easily construed by programmers skilled in the art to which the present embodiment pertains.

It will be understood by those skilled in the art that other changes may be made therein without departing the spirit and features of the present invention.

Therefore, the foregoing detailed descriptions are not restrictively construed in all aspects but have to be considered as illustrative purposes. The scope of the embodiment has to be determined by rational interpretation of appended claims, and all changes within the equivalent scope of the embodiment belong to the scope embodiment.

INDUSTRIAL APPLICABILITY

Embodiments may be applied in the field of wireless charging.

The invention claimed is:

1. An wireless charging apparatus comprising:
a housing; and
a coil disposed on the housing,
wherein the housing comprises:
  a flat part including a hole;
  an inner wall corresponding to the hole; and
  an outer wall corresponding to an edge of the flat part,
wherein the coil is disposed between the inner wall and the outer wall, and
wherein a first distance between the coil and outer wall is longer than a second distance between the coil and inner wall.

2. The wireless charging apparatus of claim 1,
wherein the coil has a two layered spiral shape.

3. The wireless charging apparatus of claim 1,
wherein the housing includes a ferrite shield,
wherein the flat part has a disk shape,
wherein the hole is in a middle of the flat part,
wherein the inner wall has a hollow cylinder shape, and
wherein the outer wall has a hollow cylinder shape.

4. The wireless charging apparatus of claim 2,
wherein the outer wall includes a recess in which a part of the coil is disposed.

5. The wireless charging apparatus of claim 4,
wherein the coil includes a first coil layer and a second coil layer on the first coil layer, and
wherein the first coil layer is serially connected to the second coil layer.

6. The wireless charging apparatus of claim 5,
wherein an end of the first coil layer and an end of the second coil layer are out through the recess.

7. The wireless charging apparatus of claim 6,
wherein heights of the outer wall and the inner wall are equal to or greater than a sum of heights of the first coil layer and the second coil layer.

8. A wireless charging apparatus comprising:
a shield; and
a coil disposed on the shield,
wherein the shield comprises:
  a flat part including a hole;
  an inner wall corresponding to the hole; and
  an outer wall corresponding to an edge of the flat part,
wherein the coil is disposed between the inner wall and the outer wall, and
wherein the coil is spaced apart from the inner wall and spaced apart from the outer wall.

9. The wireless charging apparatus of claim 8,
wherein the coil has a two layered spiral shape.

10. The wireless charging apparatus of claim 8,
wherein the shield includes a ferrite shield,
wherein the flat part has a disk shape,
wherein the hole is in a middle of the flat part,
wherein the inner wall has a hollow cylinder shape, and
wherein the outer wall has a hollow cylinder shape.

11. The wireless charging apparatus of claim 8,
wherein the outer wall includes a recess in which a part of the coil is disposed.

12. The wireless charging apparatus of claim 11,
wherein the coil includes a first coil layer and a second coil layer on the first coil layer, and
wherein the first coil layer is serially connected to the second coil layer.

13. The wireless charging apparatus of claim 12,
wherein an end of the first coil layer and an end of the second coil layer are out through the recess.

14. The wireless charging apparatus of claim 12,
wherein heights of the outer wall and the inner wall are equal to or greater than a sum of heights of the first coil layer and the second coil layer.

15. A wireless charging apparatus comprising:
a shield; and
a coil disposed on the shield,
wherein the shield comprises:

a flat part including a hole;
an inner wall corresponding to the hole; and
an outer wall corresponding to an edge of the flat part,
wherein the coil is disposed between the inner wall and the outer wall,
wherein the coil includes a first coil layer and a second coil layer on the first coil layer,
wherein the outer wall includes a recess,
wherein heights of the outer wall and the inner wall are equal to or greater than a sum of heights of the first coil layer and the second coil layer, and
wherein a part of the first coil layer and a part of second coil layer are disposed in the recess.

* * * * *